2,891,992

PROCESS FOR THE REARRANGEMENT OF SALTS OF AROMATIC OR HETEROCYCLIC CARBOXYLIC ACIDS

Bernhard Raecke, Dusseldorf, Bruno Blaser, Dusseldorf-Urdenbach, Werner Stein, Dusseldorf-Holthausen, and Hubert Schirp, Dusseldorf, Germany, assignors to Henkel & Cie. G.m.b.H., Dusseldorf-Holthausen, Germany, a corporation of Germany No Drawing. Application December 5, 1956
Serial No. 626,301

Claims priority, application Germany December 8, 1955

8 Claims. (Cl. 260—515)

This invention relates to a process for producing symmetrical carboxylic acids on a ring structure such as an aromatic or a heterocyclic ring structure by a rearrangement reaction. The invention more particularly relates to such a process wherein the reaction is carried out in the presence of finely divided solids.

We have already discovered that the alkali salts of carboxylic acids whose carboxyl groups are linked to aromatic ring systems or heterocyclic rings with aromatic structure can be rearranged by heating them to elevated temperatures. During this rearrangement the carboxyl groups may change place within the same molecule or also between molecules. If the starting material in a monocarboxylic acid rearrangement of the carboxyl groups principally takes place which forms one molecule of a ring system free from carboxyl groups and one molecule of the ring system having two carboxyl groups attached out of two molecudes of the monocarboxylic acid, while in the treatment of di- and poly-carboxylic acids both the rearrangement and decarboxylation may occur. In aromatic ring systems, for example, the formation of dicarboxylic acids is favored wherein the carboxyl groups are in para position with respect to each other but also symmetric polycarboxylic acids are formed, for example trimesic acid. Similarly, during rearrangement of heterocyclic carboxylic acids the formation of reaction products of symmetric structure is favored. Thus, heterocyclic carboxyl acids with 5 or 6 ring members and with one hetero atom, especially 2,5-dicarboxylic acids, are formed, while in the case of compounds having six ring members the formation of 2,4,6-tricarboxylic acids is favored. This rearrangement can be carried out in the presence of solid or liquid diluents and in the presence of catalysts.

One of the objects of this invention is the rearrangement of cyclic carboxylic acids to form symmetrical carboxylic acids on the same ring structure.

Another object of this invention is the rearrangement of cyclic carboxylic acids in the presence of finely divided solid materials.

A further object is to increase the yield of symmetrical cyclic carboxylic acids in a rearrangement of cyclic carboxylic acids. These and other objects will become apparent as the description of the invention proceeds.

This application is a continuation-in-part of our co-pending application, Serial No. 480,620, filed January 7, 1955.

We have now found that the rearrangement of aromatic carboxylic acids or heterocyclic carboxylic acids having an aromatic structure is influenced by the presence of finely divided solid materials and can be carried out especially advantageously in the presence of finely divided solid materials having a large exterior surface whose particle size lies below that of the ordinary powders produced by milling, preferably below $1\mu$ (micron). The presence of these substances favorably influences the rearrangement reaction in several respects. First of all, the mechanical-physical properties of the reaction material are improved so that, for example, the formation of lumps and sintering during the reaction is reduced or completely prevented, whereby the commercial performance of the reaction is considerably facilitated. Furthermore, in many cases the force or direction of the reaction itself is favorably influenced, namely in that the yield of valuable side products is increased or decreased. For example, by adding the substances according to the present invention to alkali metal salts of phthalic acid or pyridine monocarboxylic acids, and thereafter subjecting the mixture to the rearrangement reaction, the yield of trimesic acid or pyridine 2,4,6-tricarboxylic acid is materially increased. By using larger particle size solid material the yield of tricarboxylic acids relative to dicarboxylic acids is diminished. The addition of these substances has the further advantage that they very often effect a reduction in the optimum reaction temperature. This advantage is of particular importance when relatively easily decomposable starting materials, for example, salts of heterocyclic carboxylic acids, are used.

The finely divided solid materials which may be added to the starting material during the rearrangement of salts of aromatic or of heterocyclic carboxylic acids with aromatic structure in accordance with the present invention may be metals or non-metallic substances or their compounds of chemically varying nature. Apparently it is not so much a matter of chemical properties of such substances but rather the finely divided form in which they are present which is important for the process of this invention. Such substances are, for example, activated charcoal, carbon black or other forms of finely divided carbon, finely divided silicic acid (silica), such as the commercial filler for rubber, finely divided calcium carbonate or Kieselguhr. However, finely divided metals, which have been comminuted according to various known methods, or alloys may be used, as well as metal oxides such as finely divided aluminum oxide which is also available as commercial rubber filler, zinc oxide or tin oxide. Especially effective also are those metal or metalloid oxides which are obtained by thermal decomposition of volatile metal or metalloid compounds in the gaseous phase in very finely divided form, and whose particle size ranges from between about 10 and 50 $\mu$. Similarly, the sulfides, carbonates, silicates, phosphates and other salts of various metals may also be used for the process according to this invention, provided they are present in sufficiently finely divided form. Some substances can be comminuted by especially fine milling to such an extent that they have a more or less distinct effect within the scope of the present process. The particle size of such powders for such special effects should lie below 50 $\mu$, preferably below 1 $\mu$.

The amounts of the finely divided additives according to the present invention may vary between wide limits and, depending upon the particle size and other properties of the additives, may lie between about 0.05 and 50% based upon the weight of the reaction mixture. A practical method for achieving a uniform distribution of these additives throughout the reaction mixture consists in forming an aqueous solution of the aromatic or heterocyclic carboxylic acid salts serving as the starting material, suspending the additives according to the present invention, if desired together with catalysts in this solution and then drying this suspension in a spray-drier or on drum driers to form a dry powder. Since the starting material must be subjected to the rearrangement reaction in as dry a condition as possible, this method of distributing the additives in the reaction mixture is especially advantageous.

The finely divided solid materials do not themselves have in every case a catalytic effect upon the rearrangement reaction so that in addition to these finely divided materials, catalysts may simultaneously be used, especially those metals whose oxides have the property of transferring an excess of electrons, for example zinc, cadmium, mercury and lead, or various compounds of these metals, for example, their oxides, hydroxides, sulfides, halides, or their inorganic or organic acid salts.

It is further possible to add other liquid or solid materials which do not take part in the rearrangement reaction in addition to the above named finely divided substances with large exterior surfaces and in addition to the above catalysts; examples of such inert substances are heat stable liquids such as diphenyl oxide, sand, inert salts, metal powder, metal shavings, coke and the like.

Suitable starting materials for the process according to the present invention are especially alkali metal salts of aromatic mono and polycarboxylic acids, especially their sodium or potassium salts (for economic reasons), for example the salts of benzoic acid, phthalic acid or isophthalic acid, or also salts of tri- or polycarboxylic acids of benzene or mixtures of any of these acids, as well as mono and polycarboxylic acids of naphthalene or diphenyl. The lithium, cesium and rubidium salts may also be used but are normally too expensive as compared with alkali metal salts such as the potassium and sodium salts. Similarly, the alkali metal salts of heterocyclic carboxylic acids having an aromatic structure, that is the alkali metal salts of heterocyclic carboxylic acids with 5- or 6-membered rings with a conjugated double bond, are suitable starting materials for the process according to the present invention. Examples of such starting materials are salts of mono and polycarboxylic acids of pyridine, pyrazine, pyrimidine, pyridazine, alpha-pyran, furan, thiophene, pyrrole, thiazole, quinoline, isoquinoline, indole, benzotriazole, benzimidazole and the like. In all these carboxylic acids the aromatic ring or the heterocyclic ring having an aromatic structure may in addition to the carboxyl groups also carry other substituents provided that such substituents do not bring about a decomposition of the molecule below the reaction temperature at which the rearrangement reaction takes place. As a rule, those di- and tricarboxylic acids having a symmetrical structure which are formed during the rearrangement reaction, for example terephthalic acid, are not used as starting materials for the process according to this invention since they already have the structure formed by the reaction.

Instead of the alkali metal salts of the above named acids, reaction mixtures which form the alkali metal salts may also be used as the starting material for the rearrangement reaction. Especially mixtures of dicarboxylic acid anhydrides, for example phthalic acid anhydride, and alkali metal carbonates, for example, potassium carbonate, are such suitable mixtures. These mixtures need not be present in stoichiometric ratios. One or the other component may also be used in excess. It is, however, practical to employ mixtures of alkali metal salts of two different metals, especially potassium and sodium salts, because the mechanical properties of the reaction mixture are thereby very often improved.

As a rule, temperatures above 300° C. are required to bring about the rearrangement reaction. However, in isolated cases, for example in the case of some heterocyclic carboxylic acids, the rearrangement takes place at temperatures between 200° and 300° C. The upper limit of the reaction temperature is determined by the temperature at which the organic substances decompose. For this reason it is generally preferred not to exceed the temperature of 500° C. The most favorable reaction temperature depends upon the nature of the starting material used and may be determined for each individual case.

In those cases where two or more reaction products are formed, the most favorable yields of the different reaction products are often obtained at temperatures which are not very widely separated.

It is further advantageous to exclude the presence of oxygen during the reaction period. Therefore, it is advantageous to carry out the rearrangement reaction in the presence of an inert gas or vapor, for example in the presence of carbon dioxide or nitrogen. Under those conditions the reaction may be carried out at subatmospheric pressures, atmospheric pressure, and elevated pressures.

It is advantageous to provide a uniform distribution of heat throughout the reactant during the rearrangement reaction, for example by carrying out the reaction in vessels provided with a stirring device or in rotary furnaces or by heating thin layers of the starting materials without agitation. The stirring or other type of agitation of the reaction mixture is considerably facilitated by adding the finely divided materials according to the present invention since, as already indicated, they produce a considerable improvement in the mechanical properties of the reaction mixture.

In order to work up the resulting reaction mixture, it is dissolved in water and freed from indissoluble components by filtration or by treatment with activated charcoal or other absorbents. In many cases, such as in the case of terephthalic acid, the carboxylic acids formed during the rearrangement reaction are much less soluble in water than the starting materials and can readily be separated from the aqueous solution by acidification thereof. Furthermore, the individual components of the resulting reaction mixture can be separated in many cases by sublimation. Similarly, the reaction mixture can be worked up by fractional distillation of the esters of the carboxylic acids; as a rule this procedure presents no particular difficulties.

Inert diluents such as sand, metal powder or inert salts, can be added to the starting materials for the rearrangement reaction of alkali salts of aromatic or heterocyclic carboxylic acids. These additives, however, unless used in particularly finely divided form, do not produce the advantageous effects of the additives employed in accordance with the present invention.

The following examples are illustrative of our invention and are not intended to be limitative.

Example 1

(a) In an autoclave provided with a stirrer and having a volume of 1 liter, a mixture of 140 gm. anhydrous potassium carbonate, 150 gm. phthalic acid anhydride and 75 gm. very finely milled quartz powder (particle size 5 to 50 $\mu$) was heated for 6 hours at 400° C. Prior to heating carbon dioxide was introduced to a pressure of 50 atmospheres.

(b) In the same manner, a mixture of 140 gm. potassium carbonate, 150 gm. phthalic acid anhydride and 150 gm. coarse quartz sand from which all particles having a lesser grain size than 0.1 mm. had been screened out, was heated for 6 hours at 400° C. in an atmosphere of carbon dioxide at an initial pressure of 50 atmospheres.

The further treatment of the product in these two steps which was carried out in accordance with known methods, produced the following results:

|     | Terephthalic Acid, gm. | Trimesic Acid, gm. |
| --- | --- | --- |
| (a) | 67.5 | 34.8 |
| (b) | 67.0 | 13.4 |

Even though double the amount of quartz sand was used in part (b), the yield of trimesic acid was considerably smaller than in part (a).

Example 2

An intimate mixture of 50 gm. dipotassium phthalate, 50 gm. activated charcoal with a surface of about 3 x 10$^4$ m.$^2$/g. and 1.5 gm. cadmium fluoride were heated in an autoclave for two hours at 380° C. at a constant carbon dioxide pressure at 10 atm. gauge. The reaction product weighing 96.2 gm. was dissolved in hot water, the charcoal and the catalyst were separated by filtration, and the solution of the potassium salts of the aromatic carboxylic acids was acidified at the boiling point with hydrochloric acid. The precipitated terephthalic acid filtered off while the solution was still hot, repeatedly washed with hot water, and then dried at 130° C. The yield was 10.0 gm. The mother liquor and the wash water were combined and extracted with ether. After evaporating the ether, 20.9 gm. of a carboxylic acid mixture remained behind from which 12.65 gm. benzoic acid was sublimed. The residue (acid #806; acid number for benzene tricarboxylic acid calculated as 800) was transformed into a trimethyl ester and then identified to be trimesic acid in accordance with known methods. The yield amounted to 8.25 gm.

Example 3

An intimate mixture of 100 gm. dipotassium phthalate, 25 gm. nickel oxide (produced by careful combustion of pyrophoric Raney-Nickel which has a grain size of about 10 $\mu$), and 3 gm. cadmium fluoride were heated for two hours at 380° C. in an autoclave under constant carbon dioxide pressure of 10 atm. gauge. The reaction product weighing 121.6 gm. was worked up in the manner described in Example 1 and yielded 37.7 gm. terephthalic acid, 11.35 gm. benzoic acid and 16.4 gm. trimesic acid.

Example 4

A mixture of 50 gm. dipotassium phthalate and 25 gm. nickel powder (produced in known manner by thermal decomposition of nickel nitrate and subsequent reduction with hydrogen at 250° C. and which is known to have an especially small grain size) were heated for two hours at 380° C. in an autoclave under a constant carbon dioxide pressure of 10 atm. gauge. The reaction product weighing 73.5 gm. was worked up as described in Example 2 and yielded 12.05 gm. terephthalic acid, 10.2 gm. benzoic acid and 8.9 gm. trimesic acid.

Example 5

A mixture of 39.2 gm. dipotassium phthalate and 39.2 gm. nickel powder (produced as described in Example 4) were placed into an autoclave and then slowly heated over a period of 4 or 5 hours to 370° C. and then held at this temperature for an additional half-hour. The carbon dioxide pressure was maintained at 10 atm. gauge during the entire period. The reaction product weighing 76.1 gm. was worked up in the manner described in Example 2 and yielded 5.12 gm. terephthalic acid, 8.95 gm. benzoic acid and 7.4 gm. trimesic acid.

Example 6

A mixture of 50 gm. dipotassium phthalate, 25 gm. nickel powder (produced as described in Example 4), and 1.5 gm. cadmium fluoride was heated in an autoclave for two hours at 380° C. under a constant carbon dioxide pressure of 10 atm. gauge. The reaction product, weighing 76.2 gm., was worked up in the manner described in Example 2 and yielded 16.8 gm. terephthalic acid, 7.1 gm. benzoic acid and 4.6 gm. trimesic acid.

Example 7

140 gm. anhydrous potassium carbonate and 150 gm. phthalic acid anhydride in intimate admixture with 15 gm. finely divided aluminum oxide having a grain size below 50 $\mu$ such as commercially available as rubber filler, were heated for 6 hours at 400° C. in a rotary autoclave having a net volume of 1 liter. The carbon dioxide pressure at the beginning of the run was 50 atm. gauge and upon heating rose to 190 atm. gauge. A 100 gm. portion of the raw product, the total of which weighed 234 gm. was worked up as described in Example 2. The yield of terephthalic acid amounted to 31.0 gm. 8.7 gm. trimesic acid crystallized out of the mother liquor.

Example 8

An intimate mixture of 140 gm. anhydrous potassium carbonate and 150 gm. phthalic acid anhydride with 14 gm. finely divided silicic acid such as it is commercially used as filler material for rubber (the particle size of this article of commerce in accordance with producer thereof is about 15 $\mu$) was heated for 5 hours at 400° C. in a rotary autoclave having a net volume of 1 liter. The carbon dioxide pressure, which was adjusted to 50 atm. gauge at the beginning of the run, rose to 120 atm. gauge upon heating. 231 gm. of a raw product were formed. A 100 gm. portion of this raw product was worked up as described above. The yield of terephthalic acid amounted to 23.0 gm. 10.4 gm. of trimesic acid were recovered from the mother liquor.

Example 9

An intimate mixture of 1200 gm. potassium phthalate, 60 gm. cadmium oxide and 60 gm. finely divided copper powder (electrolytically powdered; the copper produced in this manner is known to have an especially small particle size) was heated for 4 hours at 390° C. in a stream of carbon dioxide in a rotary furnace having a net volume of 7 liters. Upon working up the raw product in the above described manner, 376 gm. terephthalic acid and 165 gm. trimesic acid were obtained.

Example 10

An intimate mixture of 140 gm. anhydrous potassium carbonate, 150 gm. phthalic acid anhydride and 10 gm. finely divided tin dioxide was heated for 6 hours at 400° C. in an autoclave having a net volume of 1 liter and provided with a stirring device. The initial pressure of carbon dioxide was 50 atm. gauge and the maximum pressure reached upon heating was 160 atm. gauge. The raw product formed thereby weighed 245 gm. A 100 gm. portion of this raw product was worked up in the manner described above and yielded 35.7 gm. terephthalic acid as well as 6.9 gm. trimesic acid.

Example 11

30 gm. of the tripotassium salts of hemimellitic acid admixed with 10 gm. activated charcoal with a surface of about 3 x 10$^4$ m.$^2$/g. and 1.5 gm. cadmium oxide were placed into a glass vessel resting upon a gas heated aluminum block and then heated for 10 minutes at 475° C. while passing nitrogen through the vessel. The reaction product was worked up in the above described manner and yielded 6.45 gm. terephthalic acid and 4 gm. trimesic acid.

Example 12

A mixture of 40 gm. potassium benzoate, 20 gm. nickel oxide, 25 gm. nickel oxide (produced by careful combustion of pyrophoric Raney-Nickel which has a grain size of about 10 $\mu$) and 1.2 gm. cadmium fluoride were heated for 5 hours at 440° C. in an autoclave. The reaction product was worked up in the above described manner and yielded 2.8 gm. terephthalic acid and 5.06 gm. of a mixture consisting of benzoic acid and aromatic polycarboxylic acids.

Example 13

200 gm. disodium phthalate initimately admixed with 20 gm. finely divided silicon dioxide with a particle size of about 15 $\mu$ as it is commercially available under the trade name "Aerosil" and 20 gm. cadmium oxide were heated in a rotary furnace for 3 hours at 450° C. in a stream of carbon dioxide.

The reaction product upon being worked up in the manner described above yielded 11.4 gm. terephthalic acid as well as 6.2 gm. trimesic acid and 17.4 gm. benzoic acid.

*Example 14*

An intimate mixture of 150 gm. potassium isophthalate, 20 gm. activated charcoal with a particle size of about 15 $\mu$, and 10 gm. cadmium oxide was heated in an autoclave for 6 hours at 400° C. under carbon dioxide pressure of 50 atm. gauge. The reaction product was worked up in the manner above described and yielded 50.3 gm. terephthalic acid as well as 21 gm. of a mixture of benzoic acid and aromatic polycarboxylic acids.

*Example 15*

30 gm. potassium beta-naphthalene carboxylic acid admixed with 1 gm. finely divided silicon dioxide with a particle size of about 15 $\mu$ as it is commercially available under the trade name "Aerosil" and 1 gm. zinc chloride were heated for 4 hours at 430° C. in a rotary autoclave having a net volume of 0.2 liter. At the beginning of the run carbon dioxide was introduced until the internal pressure reached 50 atm. gauge in the cold; the maximum pressure upon heating to 430° C. was 120 atm. gauge. The reaction product was worked up in the above described manner and yielded 11.2 gm. naphthalene 2,6-dicarboxylic acid.

While we have described several illustrative examples of the practice of this invention, it will be understood that we do not intend to be limited thereby, and that the invention may be practiced in other ways and various modifications and changes may be made in the examples given without departing from the spirit of the invention and the scope of the following claims.

We claim:

1. In a process for producing symmetrical aromatic di- and tricarboxylic acids which comprises the steps of converting aromatic carboxylic acids other than the symmetrical di- and tricarboxylic acids to be produced to their alkali metal salts, heating said alkali metal salts to a temperature of at least about 300° C., but not higher than the temperature at which substantial decomposition of said salts will take place, in a substantially oxygen-free inert atmosphere, the improvement which comprises increasing the amount of symmetrical tricarboxylic acids with reference to the amount of dicarboxylic acids produced by mixing a finely divided inert solid having a particle size below 50 $\mu$ with said alkali metal salts and heating said salts to a temperature of at least 300° C. and below the temperature at which substantial decomposition of said salts take place in the presence of said finely divided inert solid.

2. The process of claim 1 wherein the finely divided solid substance is silicic acid.

3. The process of claim 1 wherein the finely divided solid substance is aluminum oxide.

4. The method of increasing the amount of symmetrical tricarboxylic acid with reference to the amount of symmetrical dicarboxylic acid formed in transforming non-symmetrical benzene carboxylic acids into a mixture of symmetrical benzene dicarboxylic and tricarboxylic acids which comprises converting the non-symmetrical benzene carboxylic acids to be transformed, to their alkali metal salts, mixing a finely divided inert solid having a particle size below 50 $\mu$ with said alkali metal salts of said non-symmetrical benzene carboxylic acids and heating said mixture at a temperature above 300° C. and below the temperature at which substantial decomposition of said alkali metal salts takes place in an inert atmosphere until a substantial amount of said alkali metal salts of said non-symmetrical benzene carboxylic acids have been transformed into a mixture of alkali metal salts of symmetrical benzene dicarboxylic and symmetrical benzene tricarboxylic acids.

5. The method of claim 4 in which a catalyst selected from the group consisting of metallic zinc, cadmium, mercury, lead and their oxides, hydroxides, sulfides, halides, inorganic acid salts and organic acid salts is used.

6. The method of increasing the amount of trimesic acid with reference to the amount of terephthalic acid produced in a transformation reaction for transforming phthalic acid into a product mixture containing a mixture of terephthalic acid and trimesic acid which comprises carrying out the transformation reaction with an alkali metal salt of said phthalic acid at a temperature above 300° C. and below the temperature at which substantial decomposition of said salt takes place in an inert atmosphere and in the presence of catalysts selected from the group consisting of metallic zinc, cadmium, mercury, lead and their oxides, hydroxides, sulfides, halides, inorganic acid salts and organic acid salts, and in the presence of finely divided inert solid particles having a particle size below about 50 $\mu$.

7. The process of claim 6 wherein benzoic acid is used in place of phthalic acid.

8. The process of claim 6 wherein hemimellitic acid is used in place of phthalic acid.

References Cited in the file of this patent

UNITED STATES PATENTS 1,937,477    Mills et al.   _____ Nov. 28, 1933

FOREIGN PATENTS 522,829    Belgium   _____ Oct. 15, 1953
524,035    Belgium   _____ Nov. 30, 1953